(12) United States Patent
Hiraga et al.

(10) Patent No.: US 8,155,467 B2
(45) Date of Patent: Apr. 10, 2012

(54) IMAGE DATA PROCESSING METHOD AND IMAGING APPARATUS

(75) Inventors: Masaki Hiraga, Tokyo (JP); Kensuke Habuka, Tokyo (JP)

(73) Assignee: Morpho, Inc., Tokyo (JP)

( * ) Notice: Subject to any disclaimer, the term of this patent is extended or adjusted under 35 U.S.C. 154(b) by 941 days.

(21) Appl. No.: 12/218,355

(22) Filed: Jul. 12, 2008

(65) Prior Publication Data
US 2009/0039233 A1    Feb. 12, 2009

(30) Foreign Application Priority Data

Jul. 13, 2007   (JP) ................................. 2007-185096

(51) Int. Cl.
*G06K 9/40* (2006.01)
(52) U.S. Cl. ......................................... 382/255; 700/28
(58) Field of Classification Search .................. 348/252, 348/606, 625; 358/3.27; 382/255, 263, 264; 700/28

See application file for complete search history.

(56) References Cited

U.S. PATENT DOCUMENTS 6,636,298 B1 * 10/2003 Bachelder et al. ........... 356/73.1

FOREIGN PATENT DOCUMENTS

| JP | 2000-298300 | 10/2000 |
|----|-------------|---------|
| JP | 2005-58760  | 3/2005  |
| JP | 2005-63000  | 3/2005  |
| JP | 2000-298300 | * 10/2005 |

* cited by examiner

*Primary Examiner* — Gregory F Cunningham
(74) *Attorney, Agent, or Firm* — Muramatsu & Associates

(57) ABSTRACT

An image data processing method for sharpening a captured image; the method defines a first transformation equation to change the pixel values of a defocused image into a focused image using the coordinates of the defocused image and the focused image as arguments, calculates a DetailedFocus function from the optimal solution of the first transformation equation by giving the pixel values of the focused image and the defocused image as educational data, extracts a predetermined number of important points on the DetailedFocus function, defines a second transformation equation to change the pixel values of the important points of a defocused image into a focused image using the coordinates of the defocused image and the focused image as arguments, calculates a SmartFocus function from the second transformation equation, and produces a focused image from a defocused image using the SmartFocus function.

7 Claims, 4 Drawing Sheets

ORIGINAL IMAGE

DEFOCUSED IMAGE

FOCUSED IMAGE

IMAGE DATA PROCESSING METHOD AND IMAGING APPARATUS

BACKGROUND OF THE INVENTION

1. Field of the Invention

The present invention relates to an image data processing method and an imaging apparatus for sharpening an image that is defocused due to being captured out of focus by an imaging device such as a digital camera.

2. Description of the Related Art

There exist technologies proposed to sharpen a defocused image (also known as blurred image) that are produced when a photograph is captured out of focus. For example, in Patent Document 1, a method is proposed to correct, with high accuracy, images that are heterogeneously blurred both rotationally and with parallel displacement. This method corrects the blurring by estimating the blur vector of each pixel of an image and performing interpolated calculation on each pixel according to the blur vector of the pixel location. The blur vector is estimated using a coordinate transformation matrix for the rotational and horizontal movement occurred by camera shake.

In Patent Document 2, the blur function (point spread function (PSF)) is set using any one or more of the basic functionality parameters and the capture parameters which can be used to improve focus of each pixel in a 3 dimensional image data procured by capturing the internal structure of the photo subject under given capture parameters. And these settings of the PSF are used for the blur correction process. From the captured 3 dimensional image data, the blurs caused by the basic functionality and capture conditions are reduced for each pixel by reducing the blur component on the pixel level, and then the image processing using the 3 dimensional image data sharpens the image and improves image quality.

In Patent Document 3, in order to sharpen an image that has both focused areas and out of focus (defocused) areas, all pixels of target image is considered to be target pixels, and the estimated blur circle shows the influence to the color information of the pixels surrounding the target pixels. Furthermore, this estimated blur circle is used for the inverse PSF, which corrects the image so that the color information of the target pixels is not influenced by the surrounding pixels.

Patent Document 1: Japanese Unexamined Patent Application Publication No. 2000-298300

Patent Document 2: Japanese Unexamined Patent Application Publication No. 2005-58760

Patent Document 3: Japanese Unexamined Patent Application Publication No. 2005-63000

SUMMARY OF THE INVENTION

A focus function typically contains negative values, and their size compared to corresponding PSF is approximately 10 times larger. For example, compared to a 3×3 pixel PSF, the corresponding focus function would be about 10×10 pixels in size. Therefore, the processing cost for a focusing process is approximately 10 times larger than the processing cost of the corresponding defocusing process. For this reason, the challenge is to reduce resource usage such as memory use and CPU load.

When applying the above method to a digital camera with no macro mode, only correcting for the lack of focus will not be sufficient, as the corrections for the lack of focus and camera shake need to be processed simultaneously.

The present invention takes the above situation into consideration. The object of this invention is to provide an image data processing method and imaging apparatus that sharpens an image defocused by being captured out of focus, while reducing CPU load and memory requirements to sharpen an image.

In order to achieve the object, there is provided according to an aspect of the present invention, the image data processing method of the present invention utilizes a focus function to produce the focused image from an out of focus image (i.e. defocused image).

The focus function here is defined as a type of filter function. Filter functions are linear functions used for such purposes as to blur images and to extract edges. For example, the following filter function is used to blur images.

TABLE 1

| 0.0625 | 0.1250 | 0.0625 |
|---|---|---|
| 0.1250 | 0.2500 | 0.1250 |
| 0.0625 | 0.1250 | 0.0625 |

If the input image and output image pixel values at coordinate $(x, y)$ are determined as $s(x, y)$ and $d(x, y)$ respectively, image blurring processing can be expressed as in the following table.

A defocused image can be produced by using a blur filter such as point spread function (PSF) on a focused image. This model describes the actual defocused images that are captured. A typical PSF is analogous to a Gaussian function.

The first aspect of the present invention is to, instead of producing a blurred image using PSF, calculate a focus function which performs a focus filter and apply the focus function to a defocused image into a focused image.

Compared to Table 1 above, the focus function will be a filter like the one below.

TABLE 2

| −0.125 | −0.250 | −0.125 |
|---|---|---|
| −0.250 | 2.500 | −0.250 |
| −0.125 | −0.250 | −0.125 |

The unique characteristics of the focus function are, as stated above, the inclusion of negative values, and its larger size when compared to the corresponding PSF function. For this reason, the present invention reduces processing cost by altering the focus function.

Described in detail, the image data processing method of the present invention produces a focus function based on a focused image and a defocused of the same subject. This focus function is an image data processing method used to sharpen a captured image, the function uses the coordinates of the defocused image and the coordinates of the focused image as arguments, and it uses a DetailedFocus function to define a first transformation equation for pixel values to go from a defocused image to a focused image. The optimal solution for the first transformation equation is calculated from the focused image and the defocused image that act as educational data. Perform an important point selection process for a predetermined number of important points on the DetailedFocus function which was calculated earlier. After the important points had been extracted in the above important point selection process, the defocused image and the focused image and the SmartFocus function are used to define a second transformation equation to change the pixel values of defocused image into focused image. This second transformation equation calculates the SmartFocus function as the optimal solution from the defocused image and the focused image.

Use this SmartFocus function as the above focus function, so the focus function will allow focused image to be produced from a defocused image obtained from an imaging device.

The present invention allows the sharpening of an image with less CPU load since it does not use an inverse PSF in the image sharpening process. Instead, the DetailedFocus function is calculated in advance from a focused image and a defocused image. Then, the focus function that concentrates on important points (SmartFocus function) is recalculated using a method such as least squares or neural networks. The focused image is produced using this recalculated focus function.

This transformation equation 1 includes the following parts: DetailedFocus function values which are Fdetail(i, j), focused image pixel values which are Ifocus(x, y), defocused image pixel values which are Idefocus(x+i, y+j), where x and y are integers, and m and n are natural numbers.

[Equation 1]

$$I_{focus}(x, y) = \sum_{\substack{-m<=i<=m \\ -n<=j<=n}} F_{detail}(i, j) \cdot I_{defocus}(x+i, y+j) \quad (1)$$

The equation above is used to calculate DetailedFocus function Fdetail(i, j) by applying the least squares method from equation 1 above on any coordinate of an image, Ifocus (x, y) and Idefocus(x+i, y+j).

Also, use the following 5 steps to select important points used to calculate the SmartFocus function.
(Step 1) Select the 4 corner values of the DetailedFocus function as important points.
(Step 2) Perform Delaunay triangulation on existing important points that were retained.
(Step 3) Obtain the predictive focus function values for all points. Predictive focus function values are obtained by interpolating from the focus function value of the triangulation apex that the point belongs to.
(Step 4) Compare the predictive focus function value and the actual focus function value for all points, and then add the point with the greatest difference in value as an important point.
(Step 5) Repeat Step 2 to Step 4 until the number of important points is greater than a predetermined value.

After selecting the important points using the important point selection process detailed above, set SmartFocus function values to Fsmart(i, j). If Fsmart(i, j) is an important point then set w=1, if it is not an important point then set w=0, x and y are integers, and m and n are natural numbers. Then the transformation equation 2 to change a defocused image to a focused image is defined as follows.

[Equation 2]

$$I_{focus}(x, y) = \sum_{\substack{-m<=i<=m \\ -n<=j<=n}} w \cdot F_{smart}(i, j) \cdot I_{defocus}(x+i, y+j) \quad (2)$$

Calculate the SmartFocus function Fsmart(i, j) by applying methods such as least squares or neural networks of above equation 2 to any coordinate of an image, Ifocus(x, y) and Idefocus(x+i, y+j).

According to another aspect of the present invention, the image data processing method sharpens image data that is defocused and blurred from being out of focus and from camera shake. Multiple images are captured in one shot, and for each image use the SmartFocus function to produce its focused image, and then designate one of the focused images as the reference image. The motion data between this reference image and other focused images is calculated, and then this motion data is used to overlay multiple focused images to produce a blur compensation image.

In the present invention, initially the SmartFocus function is used on the multiple images captured in rapid succession to produce their focused images, and then multi-resolution images for each image is produced. Then a technique such as those disclosed in International Patent Application WO2006/075394 is used to perform a blur compensation process, which sharpens an image that is both out of focus and blurred due to camera shake.

According to still another aspect of the present invention, the imaging apparatus of the present invention possesses the above SmartFocus function, and is equipped with multiple SmartFocus functions for different focal distances. A SmartFocus function is selected for each image from a set of SmartFocus functions to produce a focused image. For each focused image, select a focus function depending on the edge or corner values obtained from its pixel values, and then use this focus function to produce and output a focused image as the captured image.

According to the present invention, by building in a SmartFocus function into an imaging device without a macro function, the imaging device can capture a focused image without a macro mode. SmartFocus function is implemented for each focal distance, and this allows it to prioritize images depending on a certain predetermined condition such as their edges and/or corners, and output the most focused image.

According to still another aspect of the present invention, multiple SmartFocus functions correspond to coordinates on an image. A focused image is produced by applying SmartFocus functions that correspond to coordinates on a captured image, and this focused image is output as the captured image.

According to the present invention, image distortion by causes such as lens aberration can be corrected with the use of SmartFocus functions that correspond to coordinates on an image.

As described above, according to the present invention, focus functions are calculated in advance, where they are applied to a defocused image captured by an imaging device without macro mode, and they allow sharper image focus correction without CPU load.

BRIEF DESCRIPTION OF THE DRAWINGS

FIG. 5 is an example of a focus image produced by data processing that is provided according to an aspect of the present invention where

DESCRIPTION OF THE PREFERRED EMBODIMENTS

Figure 1:
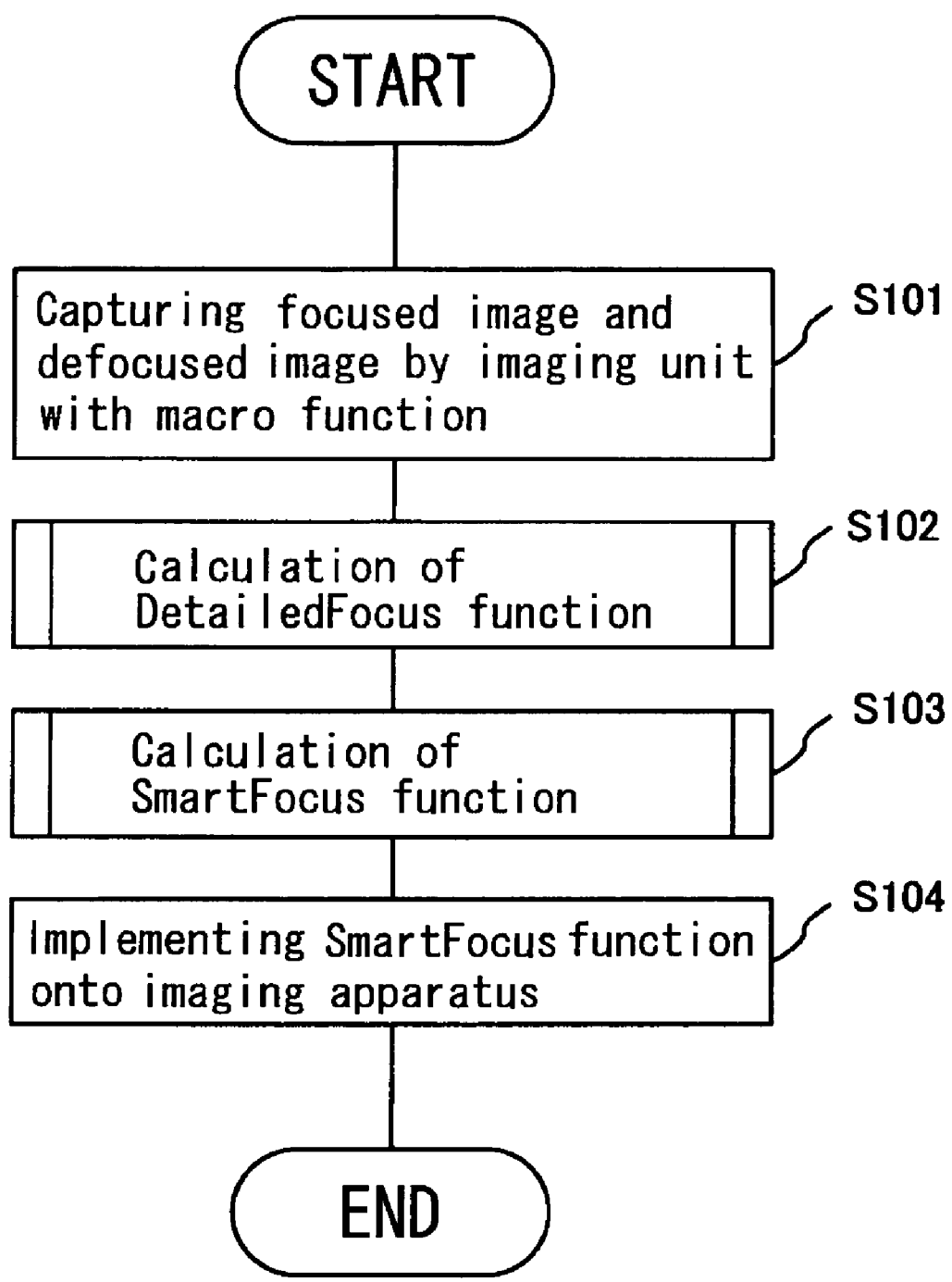
FIG. 1 is a flow chart of the digital macro process for the embodiment of the present invention.

Preferred embodiments in accordance with this invention will be described below. FIG. 1 is a flowchart of the first embodiment of the digital macro process.

Firstly, both a focused image and a defocused image are captured as original images, and then both image data are input into computing apparatus 2 such as a personal computer (S101).

An original image focused image and defocused image can be captured using the following method.

(Method 1)

A close-up image of a subject, such as a chart, is captured out of focus to obtain a defocused image. Next, to obtain a focused image, the same chart is enlarged and printed out, and then the chart printout is captured so that it will be in focus and at the same size as the defocused image. Then the focused image is input into computing apparatus 2.

(Method 2)

Firstly, an image of a subject is captured by setting an imaging unit with a macro function to the macro mode. This image is the focused image, use this image as an original image, and input this image into computing apparatus 2. Next, turn off the macro mode and capture an image of the same subject. This image, which is the defocused image since it is not in focus, also input this image into computing apparatus 2.

After step S101, the focus function is obtained from the focused image and the defocused image, and use the function for focused image calculation in computing apparatus 2. In this case, the DetailedFocus function (S102) is obtained first, and then in order to reduce processing costs of the CPU, the SmartFocus function is produced only retaining important points (S103). The algorithm to determine important points is not specified here.

This SmartFocus function is implemented onto a camera (imaging apparatus) 1, without macro mode. Focused image is produced from a defocused image captured using this camera (S104).

Figure 2:
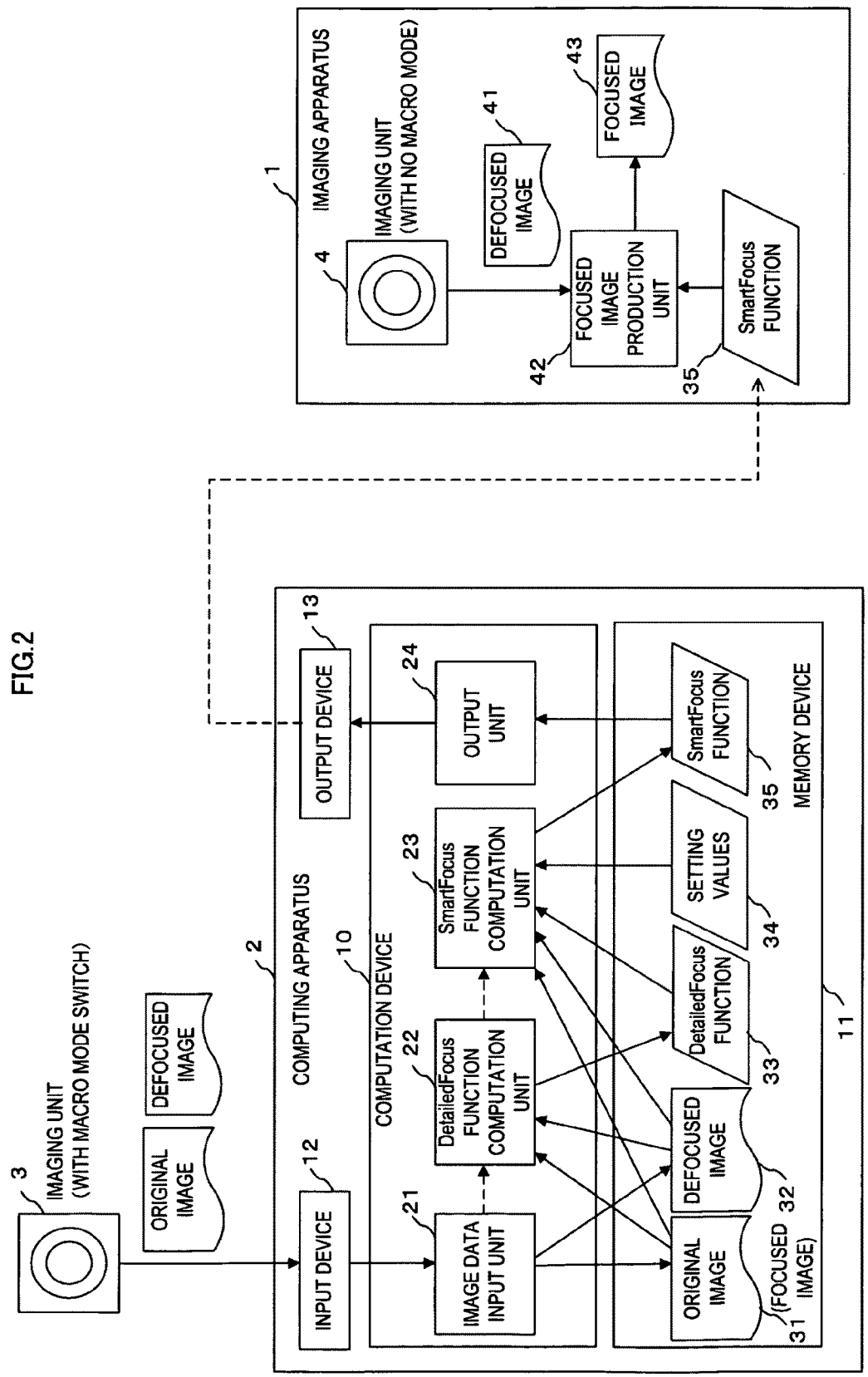
FIG. 2 is a functional block diagram of the computing apparatus and imaging apparatus used to perform image data processing for the embodiment of the present invention.

FIG. 2 is a functional block diagram of computing apparatus 2 and imaging apparatus 1 used to perform the above process. Computing apparatus 2 includes input device 13 to input external data, output device 13 to output data, processing device 10 to perform computational processes, and memory device 11 to store data. For input device 12 and output device 13, USB, FDD, CD/DVD drive device, LAN ports are possibilities. Although not in the diagram, the apparatus is capable of interfacing with devices such as keyboard, mouse, display, and printer.

Processing device 10 includes image data input unit 21 to input image data and store it in memory device 11, DetailedFocus function computation unit 22 to derive DetailedFocus function from an input image data, SmartFocus function computation unit 23 to derive SmartFocus function from DetailedFocus function, and output unit 24 to output data from memory device 11 through output device 13. Each unit from 21 to 24 can be implemented as a computer program.

Imaging apparatus 1 includes imaging unit 4 without a macro function, and focused image production unit 42 which computes focused image data 43 from implemented SmartFocus function data 35 and defocused image data 41 which was captured using imaging unit 4.

Next, operations of apparatus 1 and apparatus 2 are described.

First, a method of producing SmartFocus function data using computing apparatus 2 is described here.

<Image Data Inputting Process>

A focused image 31 and a defocused image 32 of the subject are captured using one of the methods stated in the above step S101, and these captured images are input into memory device 11 through input device 12 and image data input unit 21 of computing apparatus 2.

After the input of both image 31 and image 32, the DetailedFocus function computation unit 22 is activated to perform the following process. Computation method for DetailedFocus function is described below.

<DetailedFocus Function Computation Process>

DetailedFocus function is obtained after an original image and a defocused image are aligned. Here, a focus function is a filter function with relatively large pixel size. DetailedFocus function is a focus function with function values based on a unit of one pixel (or several pixels), this improves accuracy but the increase in data volume also increases the required time for focus computation processing.

Equation 1 above is formulated when DetailedFocus function values are Fdetail(i, j), original image pixel values are Ifocus(x, y), and defocused image pixel values are Idefocus(x+i, y+j).

Then, DetailedFocus function Fdetail(i, j) is calculated by applying the least squares method to any coordinate of an image Ifocus(x, y) and Idefocus(x+i, y+j). This DetailedFocus function is computed using DetailedFocus function computation unit 22.

Figure 3:
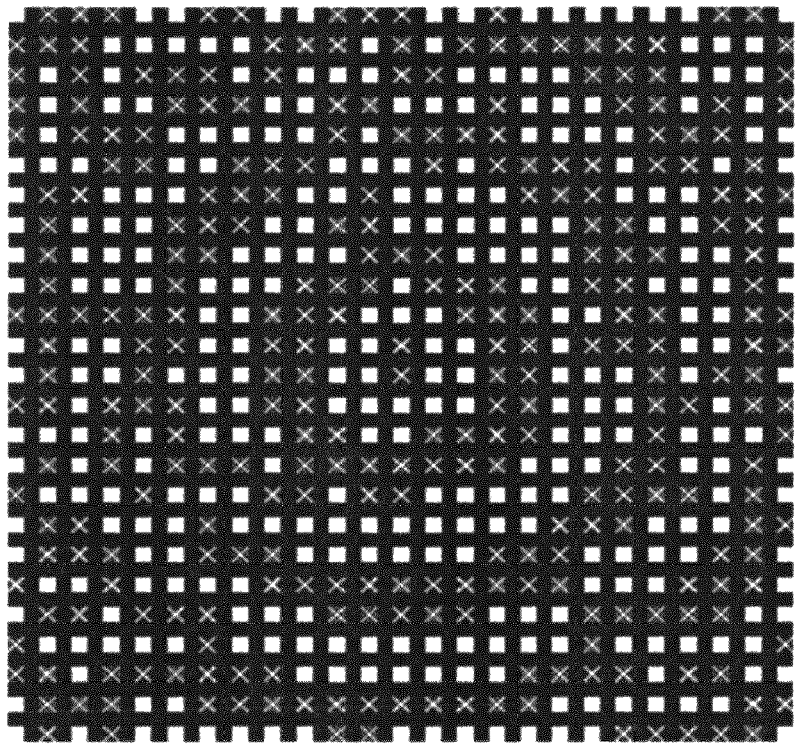
FIG. 3 is an example of a DetailedFocus function obtained using the method for the first embodiment of the present invention.

FIG. 3 shows a DetailedFocus function obtained using this method. Concentric patterns of small blocks can be seen here, which shows that values fluctuate between positive and negative in concentric circles.

There need not be DetailedFocus function for every single pixel, as using a selected sampling step such as 2 pixels or 3 pixels units is possible. Usually, when the number of pixels is increased in a focus function, the computation time increases as well, so the sampling step is adjusted to shorten the computation time.

The computational time required to obtain detailed filter function (i.e. DetailedFocus function) values for width Nw and height Nh is $O(Nw^2*Nh^2)$. Therefore the amount of computation time required becomes $\frac{1}{16}^{th}$ just by changing the sampling step from 1 pixel to 2 pixels. However, as the sampling step increases in size, the accuracy decreases. FIG. 3 is the result of the detailed filter function value of 27 by 27 and sampling step of 2, white and grey squares in the figure indicates positive values, the x's indicate negative values, and lighter colors indicate greater absolute values. The pixel size is 53 by 53 pixels for this filter function image.

With detailed filter function values of Nw*Nh values, pixel step s, pixel size Sw*Sh, then the following equations are true.

$$Sw=s*(Nw-1)+1$$

$$Sh=s*(Nh-1)+1$$

<Computation Process for SmartFocus Function>

Next, SmartFocus function computation unit 23 is activated, and a SmartFocus function is obtained from a DetailedFocus function. A DetailedFocus function has a large number of points, therefore it requires a fair amount of time to compute and produce a focused image.

Therefore, points that are not important in the DetailedFocus function do not retain their value, only values of important points will be retained to be used in focused image calculation. This focus function only using important points is the SmartFocus function.

A user will input a DetailedFocus function, number of important points Nimp, and original image/defocused image to calculate the SmartFocus function. Nimp is 0 or greater and less than or equal to Nw*Nh. As the value of Nimp increases the SmartFocus function becomes more accurate, but more time consuming to focus an image.

Firstly, the SmartFocus function computation unit 23 selects important points using the following steps.

(S1) Select the 4 corner values of the DetailedFocus function as important points.

(S2) Perform Delaunay triangulation on existing important points that were retained.

(S3) Obtain the predictive focus function values for all points. Predictive focus function values are obtained by interpolating from the focus function value of the triangle apex that the point belongs to.

(S4) Compare the predictive focus function value and the actual focus function value for all points, and add the point with the largest difference in value as an important point.

(S5) Repeat (S2) to (S4) until the number of important points, Nimp, is greater than a predetermined value.

One of characteristics of the SmartFocus function computation process of this embodiment is that SmartFocus function computation unit 23 selects important points, then after Step S5, the focus function Fsmart(i, j) of the important points is recalculated using the least squares method. The transformation equation to a defocused image is formulated as above in equation 2.

The focus image accuracy is improved by not using DetailedFocus function values Fdetail(i, j) of the important points, and recalculating focus function value Fsmart(i, j) instead.

Figure 4:
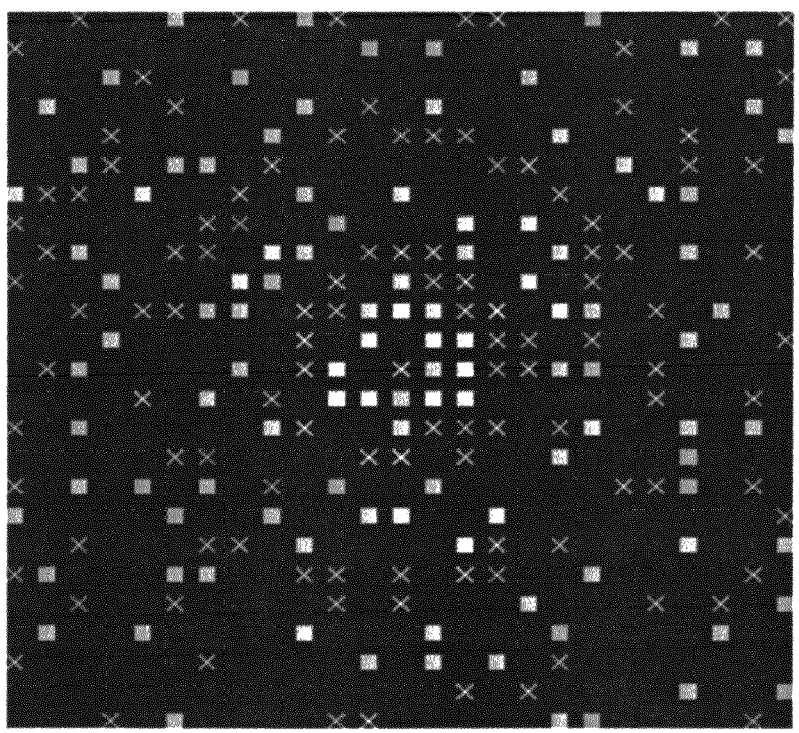
FIG. 4 is an example of a SmartFocus function obtained using the method for the first embodiment of the present invention.

FIG. 4 is an example where the SmartFocus function was obtained through the above process, the DetailedFocus function initially had 729 independent values, but its computed SmartFocus function only has 256 independent values. In FIG. 3 and FIG. 4, all black boxes with no squares or x's indicate that no value is contained.

<Implementation and Operation in an Imaging Apparatus>

The SmartFocus function computation unit 23 produces SmartFocus function data, which is output through output unit 24 and output device 13, and then implemented onto the memory device of an imaging apparatus 1.

And then an image is captured by imaging unit 4 without macro function, which is a defocused image, and then the SmartFocus function data and equation 2 is used to produce a focused image data in focused image production unit 42 in imaging apparatus 1.

Figure 5A:
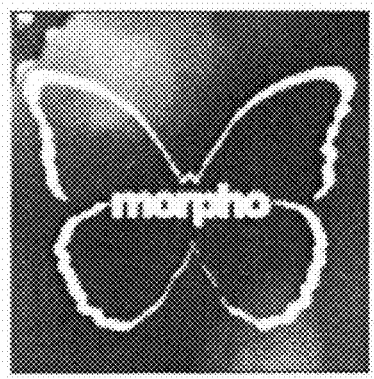
FIG. 5A is the original image.
Figure 5B:
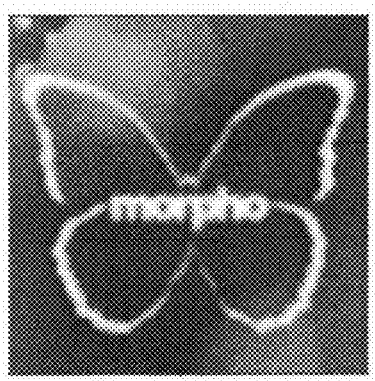
FIG. 5B is the defocused image.
Figure 5C:
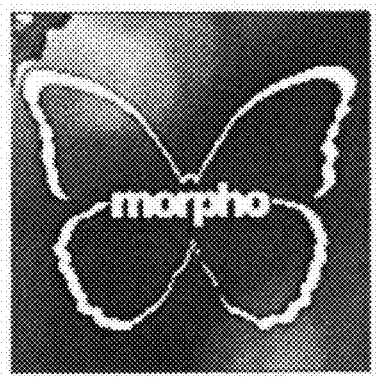
FIG. 5C is the focused image.

FIG. 5 is one example of a focused image produced by data processing that is provided according to an aspect of the present invention of this embodiment. FIG. 5A is the original image used to compute the focused function, FIG. 5B is the defocused image, and FIG. 5C is the focused image which was made sharper by the focus function.

One possible solution would have prepared several patterns of focus functions that apply to different focal distances, and then use the edge strength (sharpness) of each focused image that was calculated using each focus function and have them compared to each other to select the best one.

Yet another possible method would have different focus functions prepared according to coordinates on an image (including areas) such as distance from the center of image, and apply different focus functions depending on the coordinate on an image to produce a focused image. This will have the effect of being able to correct image distortions caused by lens aberrations.

According to this embodiment of the present invention, a focused image can be produced without burdening the CPU with heavy load while also using little memory due to the use of SmartFocus functions which will be computed and built into an imaging apparatus to produce a focused image.

A second embodiment of the present invention is described here. This embodiment describes the procedure for correcting and sharpening an image that is both out of focus and has camera shake when it was captured by imaging unit 4 without a macro function.

For an image where it is both out of focus and has camera shake, the following steps S11 to S15 can be taken to produce a focused image corrected for camera shake.

(S11) First, produce an intensity image of n defocused images that were captured in rapid succession.

(S12) Next, extract feature points from each intensity image.

(S13) Of the n intensity images, use one of its intensity images as the reference image, such as the first one which allows images obtained afterwards to become target images, and by performing the feature point matching process, the motion data can be calculated. Therefore, calculate the motion data between the corresponding feature points of the reference image and each of n−1 target images.

(S14) Use a SmartFocus function to produce focused images of the n defocused images, and for each focused image perform the intensity image production process of step S11 and feature point extraction process of step S12.

(S15) Calculate the motion data of a focused image using a motion data of a defocused image obtained in step S13 as its initial value, and this motion data is applied to all intensity images of the n focused images produced in step S14. As the motion data is calculated, continuously apply motion correction and merge the image data with the reference image.

According to this embodiment of the present invention, feature points are first extracted from defocused images, then motion data is obtained afterwards, therefore the number of levels of the multi-resolution image is decreased, or multi-resolution image processing is avoided altogether by selecting parts with strong features as feature points. This reduces the possible mismatching between feature points and also reduces CPU load. Also, by using the motion data obtained from a defocused image as its initial motion data for a lower resolution focused image, camera shake correction process and image focusing process are combined into a single process, thus decreasing execution time while realizing highly accurate camera shake correction and focused image production.

What is claimed is:

1. An image data processing method for sharpening a captured image using a focus function produced based on a focused image and a defocused image of a subject, comprising:

defining a first transformation equation that includes a DetailedFocus function, to change the pixel values of a defocused image into the pixel values of a focused image using the coordinates of the defocused image and the coordinates of the focused image as arguments;

calculating a DetailedFocus function as the optimal solution for the first transformation equation by using the pixel values of the focused image and the defocused image as educational data;

performing an important point selection process for extracting a predetermined number of important points on the DetailedFocus function;

defining a second transformation equation that includes a SmartFocus function, to change the pixel values of a defocused image into the pixel values of a focused image based on the important points using the coordinates of the defocused image and the coordinates of the focused image as arguments, after the important point selection process;

calculating a SmartFocus function as the optimal solution for the second transformation equation by using the pixel values of the focused image and the defocused image as educational data; and producing a focused image from a defocused image captured by an imaging device using the SmartFocus function as said focus function.

2. The image data processing method according to claim 1, wherein the first transformation equation is described as $$I_{focus}(x, y) = \sum_{\substack{-m<=i<=m \\ -n<=j<=n}} F_{detail}(i, j) \cdot I_{defocus}(x+i, y+j)$$

where Fdetail(i, j) is values of the DetailedFocus function, Ifocus(x, y) is focused image pixel values, Idefocus(x+i, y+j) is defocused image pixel values, x and y are integers, and m and n are natural numbers.

3. The image data processing method according to claim 1, wherein the important point selection process comprises the following steps:

(Step 1) selecting 4 corners of the DetailedFocus function as important points;

(Step 2) performing Delaunay triangulation on existing important points;

(Step 3) calculating the predictive focus function values for all points by interpolating from the focus function values of the triangulation apex that the point belongs to;

(Step 4) comparing the predictive focus function value and the actual focus function value for all points, and then add the point with the greatest difference in value as an important point; and (Step 5) repeating Step 2 to Step 4 until the number of important points is greater than a predetermined value.

4. The image data processing method according to claim 1, wherein the second transformation equation is described as $$I_{focus}(x, y) = \sum_{\substack{-m<=i<=m \\ -n<=j<=n}} w \cdot F_{smart}(i, j) \cdot I_{defocus}(x+i, y+j)$$

where Fsmart(i, j) is values of the SmartFocus function, If Fsmart(i, j) is an important point then set w=1, if Fsmart(i, j) is not an important point then set w=0, x and y are integers, and m and n are natural numbers.

5. The image data processing method for sharpening image data that is defocused and blurred from being out of focus and from camera shake, comprising:

capturing multiple images in one shot;

producing a focused image of each of the multiple images using any one of image data processing methods according to claim 1; and thereafter designating one of the focused images as a reference image and calculating the motion data between the reference image and each of other focused images; and producing a blur compensation image by overlaying the reference image and other focused images using the motion data.

6. The imaging apparatus which possesses the SmartFocus function calculated based on any one of the image data processing methods according to claims 1 to 5, comprising:

a memory device for storing multiple SmartFocus functions for each different focal distance;

a imaging means for capturing an image; and a focused image production means for producing focused images using each of the multiple SmartFocus functions to the captured image, selecting one SmartFocus function among the multiple SmartFocus functions depending on the edge or corner values obtained from pixel values of the focused images, and outputting the focused image produced by the selected SmartFocus function as the captured image.

7. The imaging apparatus which possesses the SmartFocus function calculated based on any one of the image data processing methods according to claims 1 to 5, comprising:

a memory device for storing multiple SmartFocus functions corresponding to coordinates on an image;

an imaging means for capturing an image; and a focused image production means for producing a focused image by applying one or more SmartFocus functions that correspond to coordinates on the captured image, and outputting the focused image as the captured image.

* * * * *